United States Patent
Hook et al.

(10) Patent No.: US 6,322,467 B1
(45) Date of Patent: *Nov. 27, 2001

(54) MOVABLE BACKUP BAR ASSEMBLY

(75) Inventors: Christopher A. Hook, Howard; Ronald L. Bailey, Mt. Vernon, both of OH (US)

(73) Assignee: Jervis B. Webb Company, Farmington Hills, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/971,562

(22) Filed: Nov. 17, 1997

Related U.S. Application Data

(60) Provisional application No. 60/051,336, filed on Jun. 30, 1997.

(51) Int. Cl.[7] .................. F16H 7/18; B65G 23/16
(52) U.S. Cl. .................. 474/85; 474/111; 474/140; 198/833
(58) Field of Search .................. 474/111, 119, 474/85, 37, 136, 109, 5, 140; 198/831, 833, 729; 116/228

(56) References Cited

U.S. PATENT DOCUMENTS

| | | |
|---|---|---|
| 2,918,020 | 12/1959 | Henderson et al. . |
| 3,921,793 * | 11/1975 | Hutchinson et al. ............... 474/136 |
| 4,175,657 | 11/1979 | Dehne et al. . |
| 4,222,481 | 9/1980 | Dehne et al. . |
| 4,407,162 * | 10/1983 | Landenberger ................ 73/527 |
| 4,440,023 * | 4/1984 | Landenberger ................ 73/490 |

FOREIGN PATENT DOCUMENTS

| | | |
|---|---|---|
| 4302575 | 8/1994 | (DE) . |
| 778 154 | 7/1957 | (GB) . |
| 1 273 533 | 5/1972 | (GB) . |
| 258996 | 1/1995 | (TW) . |
| 263483 | 11/1995 | (TW) . |

OTHER PUBLICATIONS

Carr Lane Manufacturing Co., catalog, p. 40TC, Feb. 1998.*

* cited by examiner

*Primary Examiner*—David A. Bucci
*Assistant Examiner*—William C Joyce
(74) *Attorney, Agent, or Firm*—Dickinson Wright PLLC

(57) ABSTRACT

A movable backup bar assembly includes an endless drive chain, a sprocket or the like for coupling the drive chain to the power source, and a backup bar for guiding the drive chain. The assembly has two positions: a first position for holding the drive chain in engagement with the chain to be driven and a second position for holding the drive chain away from the driven chain. An actuator is provided for positively shifting the assembly between these two positions.

17 Claims, 2 Drawing Sheets

MOVABLE BACKUP BAR ASSEMBLY

This application claims the benefit of U.S. provisional patent application 60/051,336, filed on Jun. 30, 1997.

The present invention is directed toward a backup bar assembly for guiding and positioning a drive chain, and, more specifically, toward a movable backup bar assembly that can be quickly and easily shifted from a first position for holding a drive chain against an object to be driven, and a second position for disengaging the drive chain from the object.

BACKGROUND OF THE INVENTION

Drive chains are used to transfer power from a source of rotational energy to a secondary chain or similar device such as the power chain in a power and free conveyor system. The drive chain is connected between two sprockets, at least one of which is powered by a drive shaft, and includes a plurality of teeth or dogs extending outwardly from the chain for engaging the driven chain. The drive chain is positioned in proximity to the driven chain, and a backup bar is used to guide the drive chain and hold it against the driven chain. This allows the teeth on the drive chain to engage the secondary chain and transmit the rotation of the drive chain to the driven chain.

A backup bar must be carefully positioned in order to transfer power from the drive chain to the driven chain in an efficient manner. If the bar does not hold the drive chain sufficiently firmly against the conveyor chain, the teeth may slip, resulting in a lower or inconsistent level of power. If the drive chain is pressed too firmly against the conveyor chain, it may interfere with the smooth rotation of the drive shaft. If the drive chain is not properly aligned with the chain being driven, damage may result to one or both of the chains, shortening the lives thereof. Furthermore, significant stresses are placed on the backup bar by the drive chain during operation which could alter the orientation of the backup bar if it were not securely fastened in place. Therefore, drive chain assemblies are constructed with backup bars bolted in place to hold the drive chain precisely in position.

It occasionally becomes necessary to disengage the drive chain from the conveyor chain such as when performing certain maintenance tasks or when auxiliary drives are connected to the conveyor. In order to do this, it is necessary to unbolt the backup bar and remove it, or reposition it so that it no longer holds the drive chain against the conveyor chain and refasten the backup bar in this new position. Because the unbolting of the backup bar can introduce slack into the drive chain, the person performing this operation must be careful to ensure that the drive chain is completely clear of the conveyor chain and not drooping onto the conveyor or onto any other moving parts. It may also be necessary to secure the drive chain to keep it clear of the conveyor chain. Care must be taken not to operate the drive chain when slack is present because this could cause the drive chain to slip off of the drive sprockets and cause damage to nearby equipment such as the drive shaft. This repositioning process requires a variety of tools and special skills and can take approximately 15 minutes, even when performed by a skilled technician or engineer. It would therefore be desirable to provide a backup bar assembly that could be repositioned quickly to positively engage or disengage a drive chain from a conveyor chain and which could be operated without special tools or skills, yet which was still capable of securely holding a backup bar in a required position.

SUMMARY OF THE INVENTION

These and other objects are accomplished by the present invention which comprises a backup bar assembly for use in connection with a drive chain which assembly can be repositioned with an actuator operable either automatically or by hand. The actuator is preferably lockable in only one of two positions to ensure that the backup bar is either positively holding the drive chain against the conveyor chain or is separated from the drive chain, and that it is not in some intermediate position. Furthermore, the backup bar assembly may include a structure for placing tension on the drive chain to hold it away from the driven chain even when the drive chain is disengaged from the driven chain.

In a preferred embodiment of the subject invention, the drive chain assembly comprises first and second sprockets, each supported by a rotatable shaft for rotation about the longitudinal axis of the shaft. At least one of the shafts is a drive shaft connected to a power source. An endless drive chain is connected between the sprockets and rotates about the sprockets when the drive shaft turns. A backup bar is attached to a backup bar support and the backup bar support is connected to an actuator which in turn is connected to a structure that is fixed with respect to the sprockets. The backup bar is positioned inside the curve defined by the endless drive chain and in alignment with the drive chain. The actuator can be manipulated by hand to move the backup bar against the drive chain to push the drive chain into engagement with the chain being driven and then locked in place to hold the drive chain against the driven chain. The actuator can also be locked in a second position to hold the backup bar away from the drive chain.

Preferably, when the actuator is in this second position, the backup bar support places tension on the drive chain to hold it away from the chain being driven. The drive chain may still be turning when it is disengaged from the driven chain. Therefore, it is important that it be held away from the driven chain so that the driven chain will not change position when it is supposed to be at rest. Likewise, the driven chain may continue to be driven by an auxiliary drive after the main drive chain is disengaged. It is therefore important that the drive chain be held clear of the driven chain to prevent it from interfering with the free movement thereof.

It is therefore the principal object of the present invention to provide an apparatus for moving a drive chain into and out of engagement with another object.

It is another object of the present invention to provide an apparatus of the forgoing character which can be operated without the use of tools.

It is a further object of the present invention to provide an apparatus of the forgoing character which can be operated by a person without any special skills.

It is yet another object of the present invention to provide an apparatus for reducing slack in a drive chain when it is disengaged from a driven chain.

It is still another object of the present invention to provide an apparatus of the forgoing character that is lockable in a first or second position to positively hold a drive chain against or away from a driven chain.

It is yet another object of the present invention to provide an actuator for a backup bar.

BRIEF DESCRIPTION OF THE DRAWINGS

These and other object of the invention will become apparent from a reading and understanding of the following detailed description of the preferred embodiment of the invention together with the following drawings of which.

DETAILED DESCRIPTION OF THE PREFERRED EMBODIMENT

Figure 1:
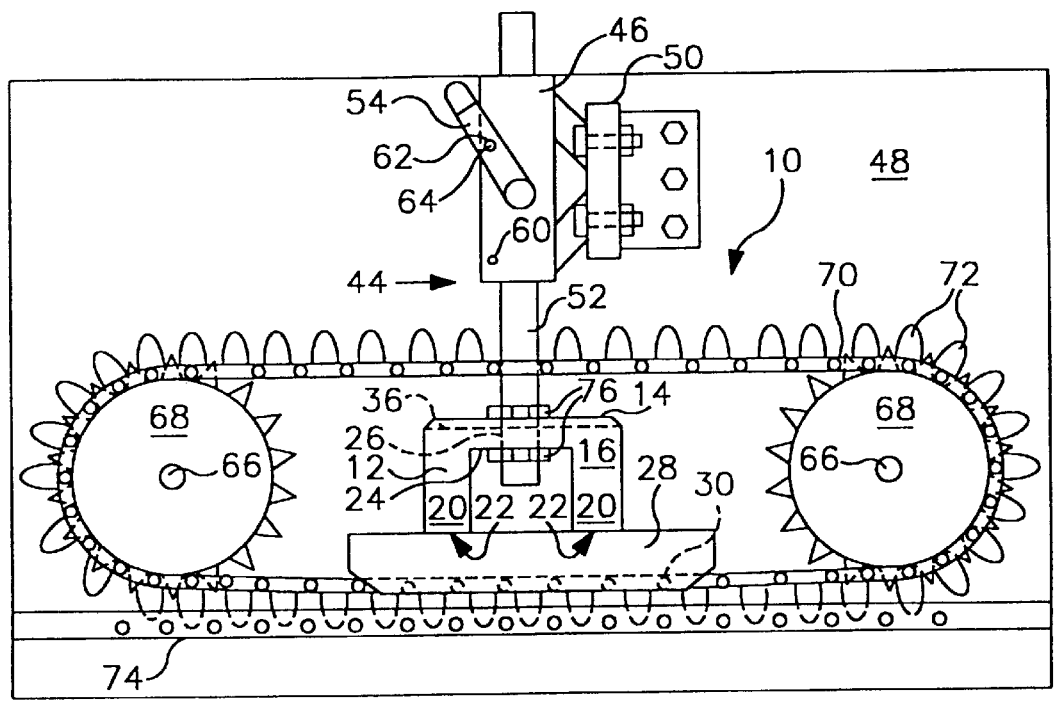
FIG. 1 is a front elevational view of a drive chain and a movable backup bar assembly according to the present invention with the backup bar shown in the down position.

Referring now to the drawings, wherein the showings are for the purposes of illustrating a preferred embodiment of the subject invention only, and not for purposes of limiting same, FIG. 1 shows a backup bar assembly designated generally by the numeral 10 comprising a backup bar support 12 having a top wall 14, a front wall 16 and a rear wall 18, two legs 20 extending away from top wall 14 and having bottom walls 22, and an inner wall 24 located between the leg bottom walls. A bore 26, connects top wall 14 with inner wall 24 and is located closer to rear 18 than to front wall 16. A backup bar 28 is attached to bottom walls 22 of support 12 and closer to front wall 16 than to rear wall 18 such as by welding or bolting, and the backup bar is preferably made from aluminum or steel or any of the other materials from which ordinary backup bars are normally constructed. Backup bar 28 comprises a length of a generally C-shaped channel section comprising a channel bottom 30 and channel sides 32, and the channel sides are flared at end portions 34 to help guide a moving chain through the channel. If bolts are used to hold backup bar 28 to support 12, the bolt heads should be counter-set below channel bottom 30 so as not to interfere with the movement of a chain across the channel bottom. Support 12 includes a channel 36 in top wall 14 located near front wall 16 and directly above and aligned with backup bar 28. A channel insert 38, made from the same material as the backup bar is fitted within channel 36, although this insert 38 may be omitted if support 12 is itself made from the same material as the backup bar. Insert 38 has flared end portions 40 which fit within flared end portions 42 of channel 36.

Backup bar 28 is supported by an actuator 44 which includes a fixed cylindrical housing 46 connected to a stationary structure 48 by brackets 50, and a movable rod portion 52 supported within housing 46 for coaxial movement with respect thereto. Actuator 44 further includes a handle 54 which is used to move rod 52 with respect to housing 46. Handle 54 is lockable in first and second positions for securely holding rod 52 in a given position, even when stresses are applied to the rod. A suitable actuator is a push/pull clamp sold by the Carr Lane Manufacturing Company of St. Louis Mo. as model number CL-300-PC. While this clamp can be locked in a given position, preferably it is modified by drilling two holes 58 and 60 into stationary structure 46 and a third hole 62 through handle 54 so that a pin 64 can be inserted through opening 62 and one of openings 58, 60 to hold handle 54 and hence rod 52, in a specific position with respect to the housing.

Stationary structure 48 is the housing of a motor for driving a drive chain. Two shafts 66 extend from openings in housing 48 and at least one of the shafts is connected to a drive for rotating the shaft. A pair of sprockets 68 are supported on the shafts and a drive chain 70 is supported by the sprockets. Chain 70 includes a number of dogs 72 extending away from the sprockets and the chain is long enough so that slack remains in it when it is supported only by sprockets 68. A driven chain 74 is located adjacent drive chain 70 close enough so that drive chain 70 can biased against driven chain 74 by removing the slack from the drive chain. When drive chain 70 is held against driven chain 74 with dogs 72 in engagement with the driven chain 74, the rotation of the drive chain will be transmitted to the driven chain causing it to rotate as well.

Figure 2:
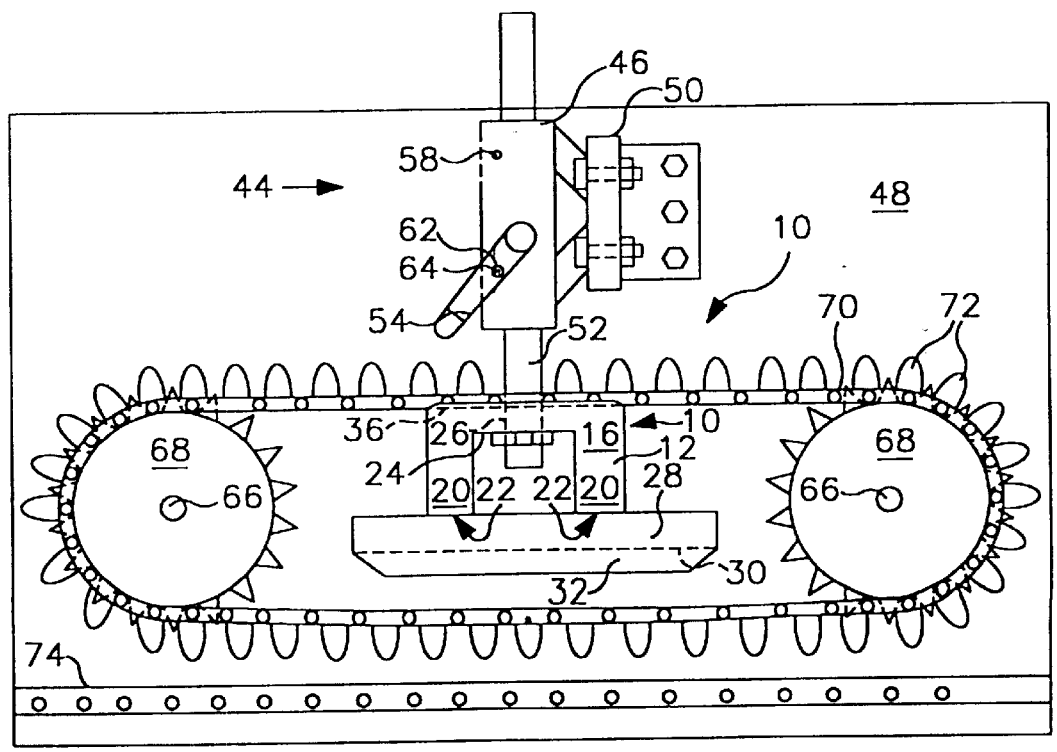
FIG. 2 is a front elevational view of the drive chain and movable backup bar assembly of FIG. 1 with the backup bar shown in the up position.
Figure 3:
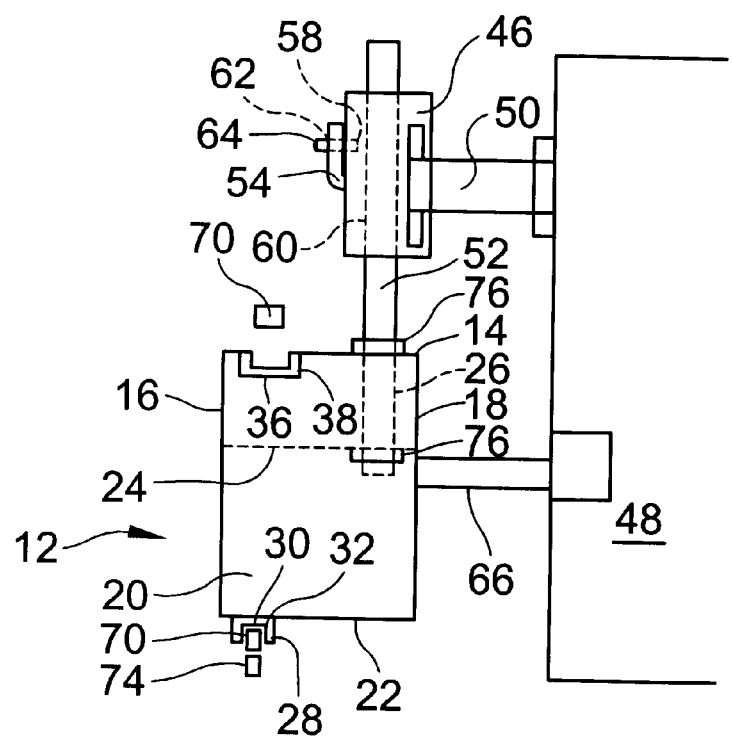
FIG. 3 is a side elevational view of the backup bar assembly of FIG. 1.
Figure 4:
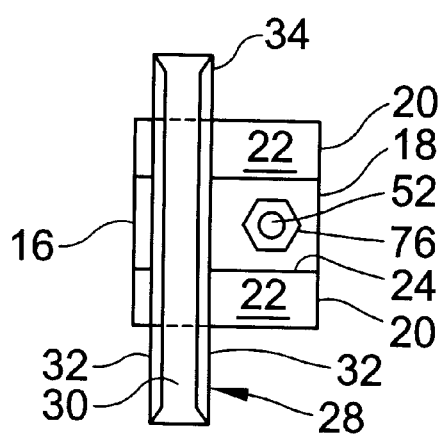
FIG. 4 is a bottom plan view of the backup bar assembly of FIG. 1.
Figure 5:
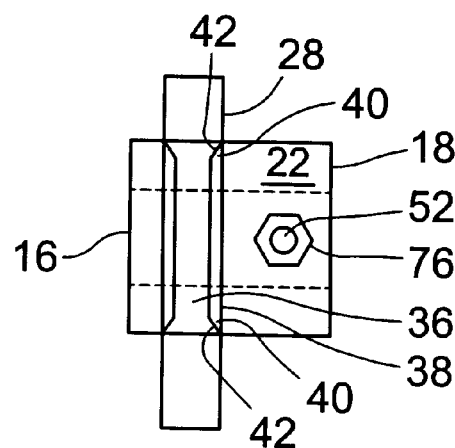
FIG. 5 is a top plan view of the backup bar assembly of FIG. 1.

Rod 52 passes through bore 26 and is secured with respect to support 12 with bolts 76 or in any other suitable manner such as by the use of pins or by welding. Actuator 44 is positioned so that backup bar 28 is aligned with the part of the drive chain adjacent driven chain 74. This portion is the lower portion of the drive chain as seen in the figures and will be referred to as the lower portion of the chain herein, it being understood that the drive chain could be oriented differently so that this portion of the drive chain would no longer be the lower portion. When backup bar 28 is in its lowered position as shown in FIG. 1, drive chain 70 is received within backup bar 28 and held in engagement with driven chain 74 so that the rotation of the drive chain will be transmitted to the driven chain. When actuator 44 is moved to the second position, shown in FIG. 2, backup bar 28 is pulled away from the driven chain and the drive chain ceases to drive the driven chain, even if the drive chain continues to rotate. In this second position, the top portion of drive chain 70 is supported by channel 36 in top wall 14 of support 12 to hold drive chain 70 taut and to keep the drive chain from drooping into contact with the driven chain which might still be moving, such as when an auxiliary drive is present in the conveyor line. Actuator 44 is freely movable between these two positions, and thus the backup bar assembly can be shifted to engage or disengage a drive chain from a driven chain in a matter of seconds, and without the use of any tools. In addition to being easier to use, it is also significantly easier to manufacture, reducing manufacturing time by approximately 25%.

The subject invention has been described with respect to a preferred embodiment in which the backup bar assembly is used to move a drive chain into and out of engagement with a conveyor chain. It should be understood, however, that the invention has broader applications and could be used any time it is necessary to hold a driving belt or chain against another object. It can also be used with a variety of different drive systems without extensive modification. These and other obvious modifications will become apparent to those skilled in the are upon a reading and understanding of this specification and such modifications are included within the scope of this invention to the extent they are defined by the claims appended hereto.

We claim:

1. In a drive chain assembly for transferring power from a power source to a driven chain, said assembly comprising an endless drive chain, sprocket means for coupling said drive chain to the power source, a backup bar for guiding said drive chain, an actuator connected to said backup bar for selectively biasing said backup bar against said drive chain, said actuator being mounted to slide between a first predetermined position where the actuator is moved to properly engage the drive chain with the driven chain and a second predetermined position where the actuator is moved to properly disengage the drive chain with the driven chain, and said actuator having a first indicating member for indicating the location of the first predetermined position and a second indicating member for indicating the location of the second predetermined position, whereby an operator can operate the backup bar assembly by moving the actuator directly between the first and second indicating members.

2. A drive chain assembly according to claim 1 wherein said backup bar comprises a backup bar support.

3. A drive chain assembly according to claim 2 wherein said backup bar support includes a first surface and a second surface and wherein said backup bar is attached to said first surface.

4. A drive chain assembly according to claim 3 wherein said second surface includes a track sized to receive said drive chain.

5. A drive chain assembly according to claim 4 wherein said first surface is generally parallel to said second surface.

6. A drive chain assembly according to claim 4 wherein said backup bar is located on the opposite side of said backup bar support from said second surface for guiding said drive chain.

7. A drive chain assembly according to claim 1 including locking means for locking said actuator in said first or said second predetermined position.

8. A drive chain assembly according to claim 1 wherein said actuator comprises a push/pull clamp.

9. A drive chain assembly according to claim 1 further comprising:
   a housing;
   a first shaft having an axis and supported in said housing for rotation about said first shaft axis;
   a second shaft having an axis and supported in said housing for rotation about said second shaft axis;
   a first sprocket supported on said first shaft for rotation about said first shaft axis;
   a second sprocket supported on said second shaft for rotation about said second shaft axis;
   the endless drive chain being supported by said first and second sprockets for rotation thereabout;
   a backup bar support connected to said housing;
   with the backup bar connected to said backup bar support.

10. A drive chain assembly according to claim 9 wherein said actuator comprises a push/pull clamp.

11. A drive chain assembly according to claim 9 wherein said actuator is lockable in said first or said second predetermined positions.

12. A drive chain assembly according to claim 1, wherein said actuator including a linear drive and a handle linked to the linear drive, the linear drive being mounted to slide between the first predetermined position whereby the backup bar engages the drive chain and the second predetermined position whereby the backup bar is disengaged from the drive chain by manual movement of the handle.

13. A backup bar assembly for engaging a drive chain with a driven chain, the backup bar assembly comprising a backup bar, a backup bar support, an actuator for shifting said backup bar and backup bar support, said actuator being mounted to slide between a predetermined first position where the actuator is moved to properly engages the drive chain with the drive chain and a second predetermined position where the actuator is moved to properly disengage the drive chain with the driven chain, and first and second indicating members for indicting the locations of the first and second predetermined position respectively, whereby an operator can operate the backup bar assembly by moving the actuator directly between the first and second indicating members.

14. A backup bar assembly according to claim 13 wherein said backup bar support includes a track on a surface opposite the backup bar, the track adapted to tension said drive chain when the backup bar in said second position.

15. A backup bar assembly according to claim 14 wherein said actuator is lockable to hold said backup bar and support in one of said first or second predetermined positions.

16. A backup bar assembly according to claim 13, wherein said actuator including a linear drive and a handle linked to the linear drive, the linear drive being mounted to slide between the first predetermined position whereby the backup bar engages the drive chain and the second predetermined position whereby the backup bar is disengaged from the drive chain by manual movement of the handle.

17. A drive chain assembly for transferring power from a power source to a driven chain, said assembly comprising:
   a housing;
   a first shaft having an axis and supported in said housing for rotation about said first shaft axis;
   a second shaft having an axis and supported in said housing for rotation about said second shaft axis;
   a power source supported by said housing fox rotating it least one of said first and second shafts;
   a first sprocket supported on said first shaft for rotation about said first shaft axis;
   a second sprocket supported on said second shaft for rotation about said second shaft axis;
   an endless drive chain supported by said first and second sprockets for rotation thereabout;
   a backup bar support connected to said housing and comprising a first wall and a second wall spaced apart from and generally parallel to said first wall, said second wall adapted to engage said drive chain;
   a backup bar connected to said backup bar support first wall;
   a lockable push/pull clamp connected between said backup bar support and said housing for moving said backup bar between a first predetermined position where the actuator is moved so that said backup bar is held against said drive chain properly engage the drive chain with the driven chain and a second predetermined position where said second wall is held against said drive chain; and
   first and second indicating members for indicting the locations of the first and second predetermined positions respectively, whereby an operator can operate the backup bar assembly by moving the actuator directly between the first and second indicating members.

* * * * *

UNITED STATES PATENT AND TRADEMARK OFFICE
CERTIFICATE OF CORRECTION

PATENT NO.    : 6,322,467 B1
DATED         : November 27, 2001
INVENTOR(S)   : Christopher A. Hook et al.

It is certified that error appears in the above-identified patent and that said Letters Patent is hereby corrected as shown below:

<u>Column 6,</u>
Please insert the following claims:

--      18. The drive chain assembly of claim 1, wherein the first indicating member is a hole and the second indicating member is a hole.

19. The backup bar assembly of claim 13, wherein the first indicating member is a hole and the second indicating member is a hole.

20. The drive chain assembly of claim 17, wherein the first indicating member is a hole and the second indicating member is a hole. --

Signed and Sealed this

Ninth Day of July, 2002

Attest:

JAMES E. ROGAN
Attesting Officer          Director of the United States Patent and Trademark Office